(12) United States Patent
Shin et al.

(10) Patent No.: US 11,362,386 B2
(45) Date of Patent: Jun. 14, 2022

(54) SHEATH MATERIAL FOR SECONDARY BATTERY AND SECONDARY BATTERY COMPRISING SAME

(71) Applicant: Samsung SDI Co., Ltd., Yongin-si (KR)

(72) Inventors: Donghyun Shin, Yongin-si (KR); Jeongdoo Yi, Yongin-si (KR); Sunil Park, Yongin-si (KR); Jungyup Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 132 days.

(21) Appl. No.: 16/619,754

(22) PCT Filed: May 2, 2018

(86) PCT No.: PCT/KR2018/005062
§ 371 (c)(1),
(2) Date: Dec. 5, 2019

(87) PCT Pub. No.: WO2018/236042
PCT Pub. Date: Dec. 27, 2018

(65) Prior Publication Data
US 2020/0144561 A1 May 7, 2020

(30) Foreign Application Priority Data

Jun. 20, 2017 (KR) .......................... 10-2017-0077974

(51) Int. Cl.
*B32B 3/00* (2006.01)
*H01M 50/124* (2021.01)
(Continued)

(52) U.S. Cl.
CPC .......... *H01M 50/124* (2021.01); *B32B 9/005* (2013.01); *B32B 15/08* (2013.01); *Y10T 428/24917* (2015.01); *Y10T 428/24926* (2015.01)

(58) Field of Classification Search
None
See application file for complete search history.

(56) References Cited

U.S. PATENT DOCUMENTS 6,383,674 B1 * 5/2002 Urry ........................ H01M 6/10
429/146
6,423,399 B1 * 7/2002 Endo ........................ B41M 5/24
428/206
(Continued)

FOREIGN PATENT DOCUMENTS

CN 102131640 A 7/2011
CN 102640319 A 8/2012
(Continued)

OTHER PUBLICATIONS

Chinese Office action issued in corresponding application No. 201880041422.X, dated Oct. 26, 2021, 15 pages.
(Continued)

*Primary Examiner* — Seth Dumbris
(74) *Attorney, Agent, or Firm* — Lewis Roca Rothgerber Christie LLP (57) ABSTRACT

The present disclosure relates to a sheath material for secondary battery including a moisture permeation preventing layer, a protective layer disposed on the first surface of the moisture permeation preventing layer wherein the protective layer includes a functional layer having a plurality of patterns and a resin layer disposed on the second surface of the moisture permeation preventing layer, and a secondary battery including the same.

11 Claims, 9 Drawing Sheets

(51) Int. Cl.
*B32B 9/00* (2006.01)
*B32B 15/08* (2006.01)

(56) References Cited

U.S. PATENT DOCUMENTS

| | | | |
|---|---|---|---|
| 2005/0112461 A1 | 5/2005 | Amine et al. | |
| 2006/0292427 A1* | 12/2006 | Bartling | H01M 50/183 429/406 |
| 2012/0164442 A1* | 6/2012 | Ong | G09F 3/08 428/336 |
| 2012/0183706 A1* | 7/2012 | Kang | B32B 27/30 428/29 |
| 2014/0141312 A1* | 5/2014 | Kim | H01M 50/449 429/144 |
| 2015/0372263 A1* | 12/2015 | Douke | B32B 27/302 429/176 |
| 2016/0087250 A1 | 3/2016 | Gu et al. | |
| 2016/0211490 A1 | 7/2016 | Hashimoto et al. | |
| 2016/0308241 A1 | 10/2016 | Kim et al. | |
| 2017/0155100 A1 | 6/2017 | Song et al. | |
| 2018/0254508 A1 | 9/2018 | Kim et al. | |

FOREIGN PATENT DOCUMENTS

| | | |
|---|---|---|
| CN | 204558551 U | 8/2015 |
| CN | 105556699 A | 5/2016 |
| DE | 10 2011 077 676 A1 | 12/2012 |
| KR | 10-2009-0056211 A | 6/2009 |
| KR | 10-2013-0005886 A | 1/2013 |
| KR | 10-2013-0099892 A | 9/2013 |
| KR | 10-2014-0134185 A | 11/2014 |
| KR | 10-1470058 B1 | 12/2014 |
| KR | 10-2015-0049616 A | 5/2015 |
| KR | 10-2015-0082118 A | 7/2015 |
| KR | 10-2016-0020759 A | 2/2016 |
| KR | 10-2017-0026428 A | 3/2017 |
| WO | WO 2014/133317 A1 | 9/2014 |

OTHER PUBLICATIONS

Chinese Office action issued in corresponding application No. CN 201880041422.X, dated Apr. 27, 2022, 6 pages including English Translation.

* cited by examiner

SHEATH MATERIAL FOR SECONDARY BATTERY AND SECONDARY BATTERY COMPRISING SAME

CROSS-REFERENCE TO RELATED APPLICATION(S)

This application is a National Phase Patent Application of International Patent Application Number PCT/KR2018/005062, filed on May 2, 2018, which claims priority of Korean Patent Application No. 10-2017-0077974, filed Jun. 20, 2017. The entire contents of both of which are incorporated herein by reference.

BACKGROUND OF THE INVENTION

(a) Field of the Invention

The present disclosure relates to a sheath material for a secondary battery and a secondary battery including the same.

(b) Description of the Related Art

A secondary battery includes an electrode assembly including positive electrode and electrodes and a separator disposed between the positive and negative electrodes and a case housing the electrode assembly. The case for the secondary battery may have various shapes having an opening at one side for example, a cylinder, a quadrangle, a pouch, or the like.

In particular, the pouch-type case is appropriate for a thin cell and easily manufactured due to a simple structure and thus is mainly being used.

SUMMARY OF THE INVENTION

An embodiment of the present disclosure provides a sheath material for secondary battery having greatly improved moisture resistance and flexibility. Another embodiment of the present disclosure provides a secondary battery including the sheath material for secondary battery.

In one aspect, the present disclosure provides a sheath material for a secondary battery including a moisture permeation preventing layer, a protective layer disposed on the first surface of the moisture permeation preventing layer wherein the protective layer includes a functional layer having a plurality of patterns, and a resin layer disposed on the second surface of the moisture permeation preventing layer.

In another aspect, the present disclosure provides a secondary battery including an electrode assembly and the sheath material for the secondary battery according to an example embodiment for receiving the electrode assembly.

The sheath material for a secondary battery according to an example embodiment of the present disclosure has excellent flexibility as well as very outstanding moisture-blocking property.

The secondary battery according to another example embodiment of the present disclosure may realize greatly improved energy density and flexibility as well as excellent economic feasibility.

DETAILED DESCRIPTION OF THE INVENTION

Hereinafter, the present disclosure will be described more fully hereinafter with reference to the accompanying drawings, in which exemplary embodiments of the invention are shown. However, this disclosure may be embodied in many different forms and is not construed as limited to the example embodiments set forth herein.

In order to clearly illustrate the present invention, parts that are not related to the description are omitted, and the same or similar components are denoted by the same reference numerals throughout the specification.

Sizes and thicknesses of components in the drawings are arbitrarily expressed for convenience of description and, thus, the present invention is not limited by the drawings.

In addition, unless explicitly described to the contrary, the word "comprise" and variations such as "comprises" or "comprising," will be understood to imply the inclusion of stated elements but not the exclusion of any other elements.

A conventional pouch-type case in general consists of a resin layer, a moisture-blocking metal layer, and an external resin layer.

By the way, as a demand on a wearable electronic device and the like is continuously increased, a demand on a secondary battery having excellent flexibility is also increased, but since the moisture-blocking metal layer takes a considerable portion of an entire thickness of the conventional pouch-type case, the pouch-type case is deformed, for example, wrinkled during the bending and thus has a problem of deteriorating flexibility of the secondary battery. In order to solve this problem, when the thickness of the pouch-type case is formed to be thin, moisture resistance is deteriorated, moisture may be easily permeated into the secondary battery and generates HF gas and thus may deteriorate performance of the secondary battery and corrode the sheath material and resultantly, bring about a problem of leaking an electrolyte solution. As a result of repetitively doing research to solve this problem, inventors of the present disclosure found out that when a functional layer having a plurality of patterns including an internal region is included in the sheath material for a secondary battery, the flexibility and simultaneously, the moisture resistance are improved and then, completed example embodiments.

Figure 1:
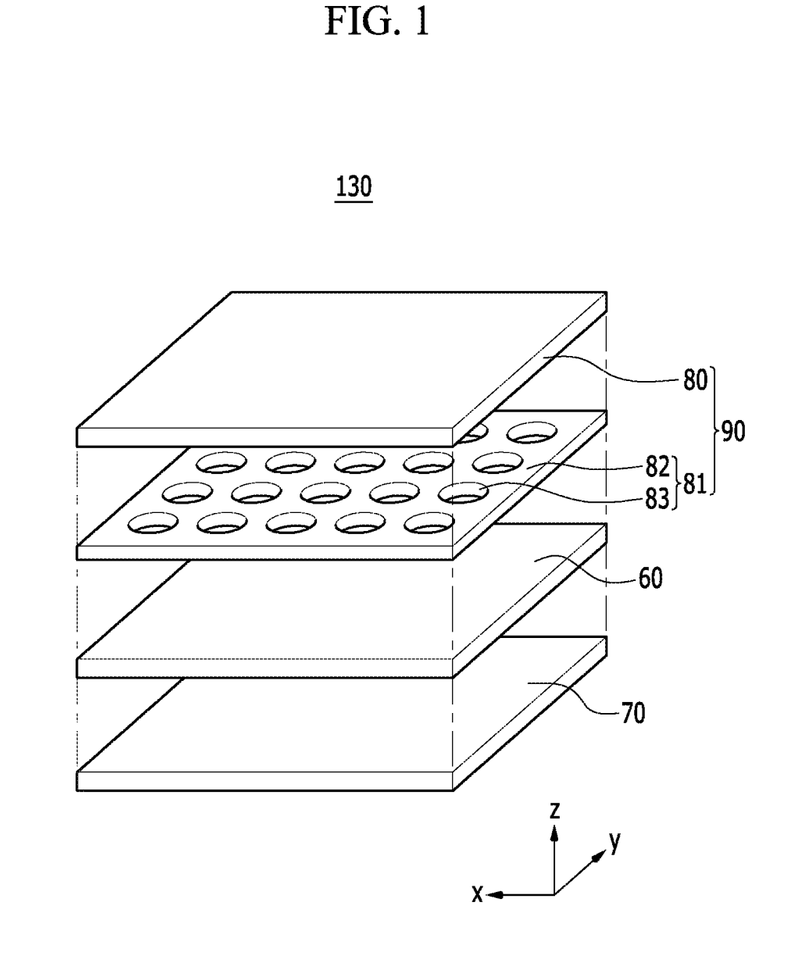
FIG. 1 is an exploded perspective view having a sheath material for a secondary battery according to an example embodiment of the present disclosure.
Figure 2:
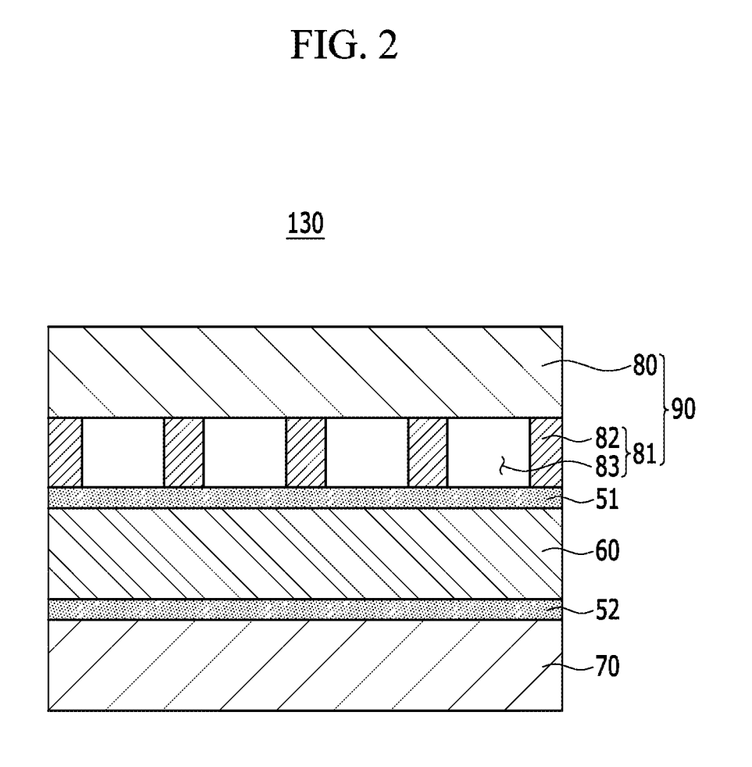
FIG. 2 is a view exemplarily showing a cross-section of the sheath material for a secondary battery according to the example embodiment of the present disclosure.

FIG. 1 is the exploded perspective view showing the sheath material for a secondary battery according to an example embodiment of the present disclosure, and FIG. 2 exemplarily shows a cross-section of the sheath material for a secondary battery according to an example embodiment of the present disclosure.

Referring to FIGS. 1 and 2, a sheath material 130 for a secondary battery according to an example embodiment of the present disclosure includes a moisture permeation preventing layer 60, a protective layer 90 disposed on the first surface of the moisture permeation preventing layer 60 wherein the protective layer 90 includes a functional layer 81 having a plurality of pattern 82, and a resin layer 70 disposed on the second surface of the moisture permeation preventing layer 60.

First, the moisture permeation preventing layer 60 plays a role of preventing permeation of external moisture and the like into the sheath material for a secondary battery and improving mechanical strength of the sheath material and also preventing external spill of an electrolyte solution and the like injected into the sheath material. As for the moisture permeation preventing layer 60, for example, a thin film formed of aluminum or an aluminum alloy and the like may be used, but is not limited thereto.

A thickness of the moisture permeation preventing layer 60 may be in a range of 5 μm to 100 μm, 5 μm to 60 μm, or 5 μm to 50 μm. When the thickness of moisture permeation preventing layer 60 satisfies the numerical range, excellent moldability as well as excellent moisture resistance is obtained, and accordingly, the sheath material 130 for a secondary battery is easy to manufacture.

On the other hand, the protective layer 90 includes the protective substrate 80 and the functional layer 81. The protective substrate 80 plays a role of protecting the sheath material 130 for a secondary battery from an external environment. The protective substrate 80 may be formed of at least one selected from the group consisting of for example, polyethylene terephthalate, polybutylene terephthalate, polyethylene naphthalate, polybutylene naphthalate, copolymerization polyester, polycarbonate, and a nylon film, but is not limited thereto.

In addition, a thickness of the protective substrate 80 may be in a range of 10 μm to 100 μm or 10 μm to 50 μm. When the thickness of the protective substrate 80 is greater than or equal to 10 μm, the film has excellent physical characteristics and thus is not easily torn apart, but when the thickness is less than or equal to 100 μm, excellent moldability such as injection, forming, and the like is obtained, and battery capacity per unit volume of the secondary battery may be improved.

In the present disclosure, the protective substrate 80 along with the functional layer 81 having a plurality of patterns 82 comprises the protective layer 90.

To provide further understanding, FIGS. 3 to 6 exemplarily show various shapes realized into the plurality of patterns 82 of the functional layer 81.

Figure 3:
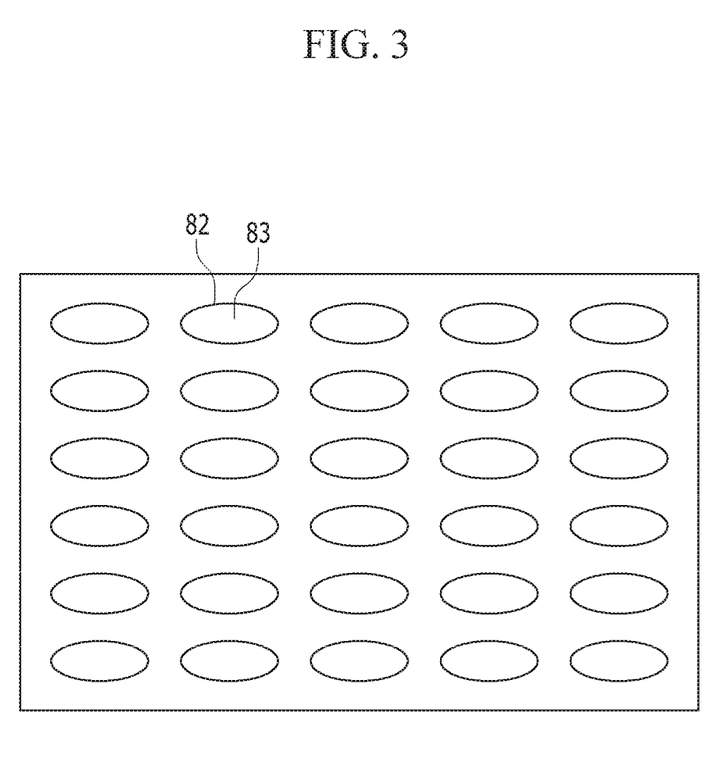
FIGS. 3 to 6 exemplarily show various shapes included in a plurality of patterns of a functional layer.
Figure 4:
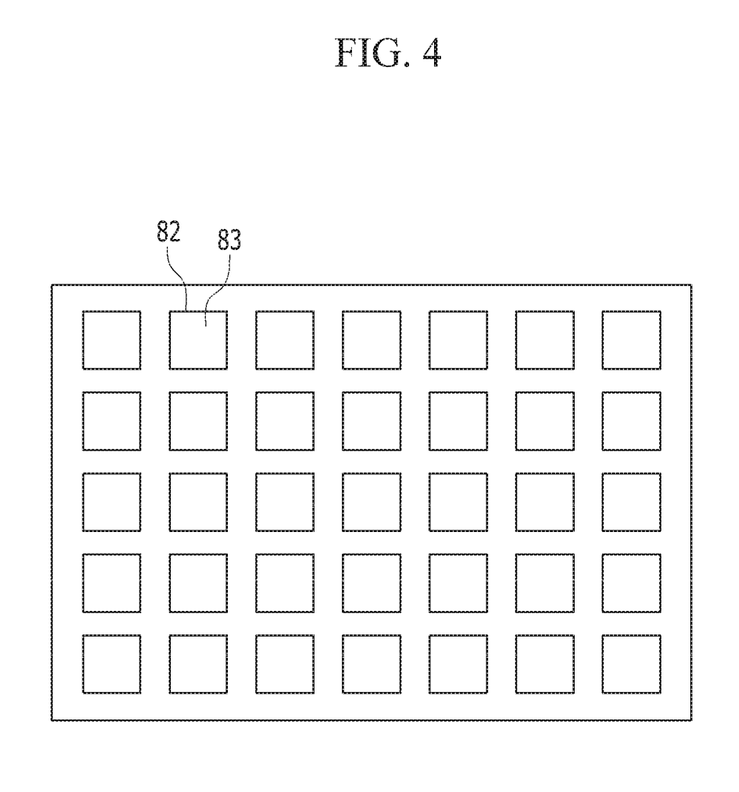
Figure 5:
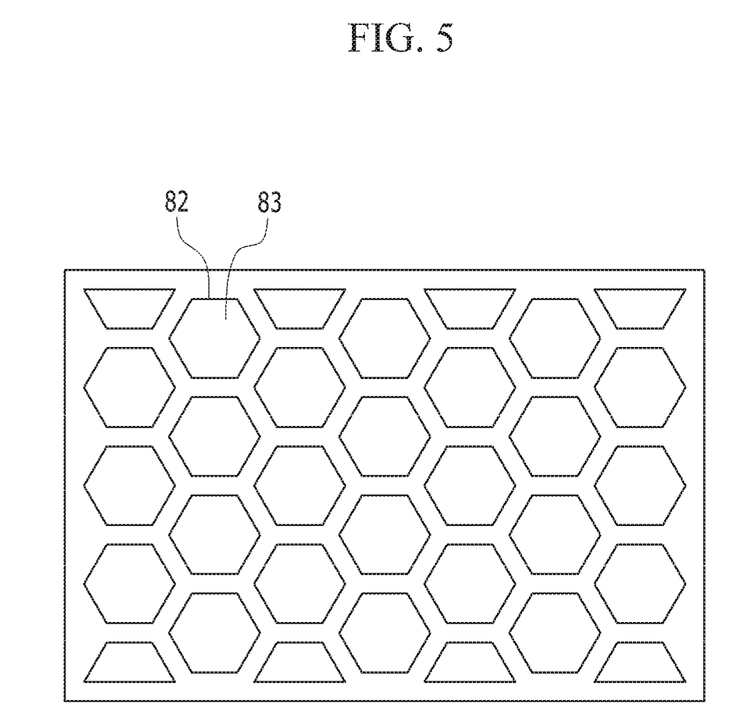
Figure 6:
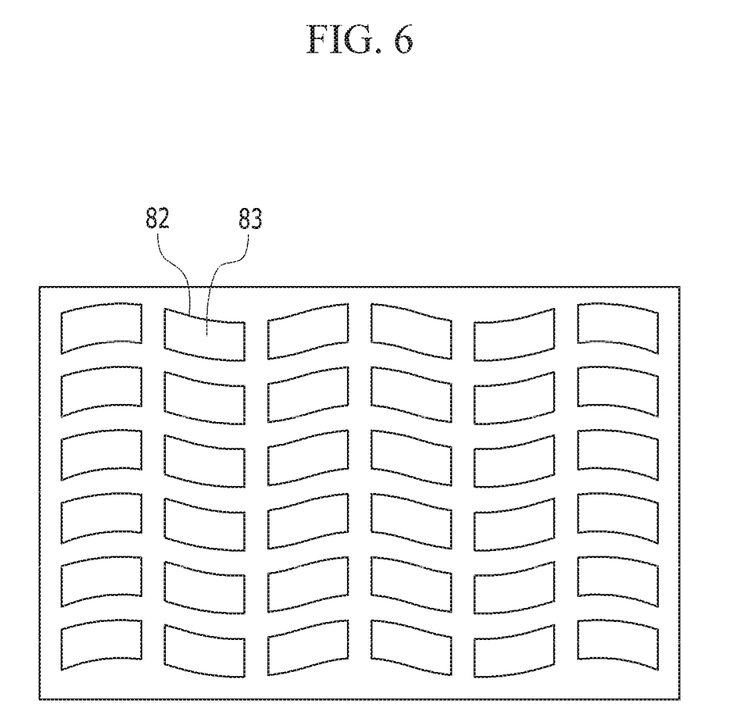

For example, the plurality of patterns 82 respectively may include a shape such as a circle, as shown in FIG. 1, an oval, as shown in FIG. 3, and a triangle, which is not shown. In addition, the shape may include a polygon such as a quadrangle, as shown in FIG. 4, a hexagon, as shown in FIG. 5, and the like and also, a closed curve such as an irregular shape, as shown in FIG. 6. Or, even though not shown here, the shapes may be mixed.

In the present disclosure, the shape formed by the plurality of patterns 82 is not particularly limited, if formed as a closed curve so that each of the plurality of patterns 82 may include an internal region 83.

A horizontal cross-section area sum of each pattern 82 having the above shape in the functional layer 81 may be 10% to 90%, 10% to 70%, or 10% to 50% based on the horizontal cross-section area of the functional layer 81. When the horizontal cross-section area sum of each pattern 82 (based on an xy plane of FIG. 1) satisfies the numerical range based on the horizontal cross-section area of the functional layer 81 (the xy plane referring to FIG. 1), flexibility and moisture resistance characteristics of the sheath material 130 for a secondary battery according to the present disclosure may be improved. When the horizontal cross-section area sum of the patterns is too large, the flexibility may be weaken. In addition, when the horizontal cross-section area sum of the patterns is too small, the flexibility may be improved, but strength of the sheath material or formation of an air layer may be disadvantaged. Accordingly, the horizontal cross-section area sum of the patterns 82 in the functional layer 81 should satisfy the numerical range based on the horizontal cross-section area of the functional layer 81.

Meanwhile, each of the plurality of patterns 82 may include an internal region 83.

As shown in FIG. 1, the internal region 83 may be configured to penetrate the functional layer 81 separately from the protective substrate 80.

Figure 7:
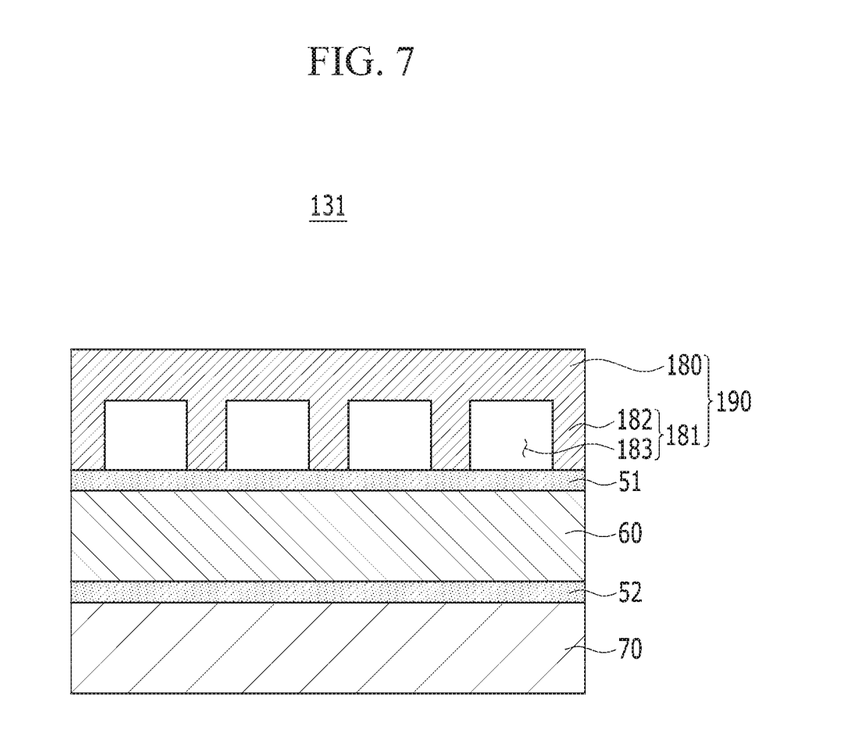
FIG. 7 exemplarily shows an exemplary variation of the sheath material for a secondary battery according to FIG. 1.

Otherwise, as shown in FIG. 7, a protective layer 190 is configured to have a shape of uniting a functional layer 181 with a protective substrate 180 by forming an internal region 183 in the protective substrate 180 itself in a method of retracting a portion of the protective substrate 180 and the like.

Herein, FIG. 7 exemplarily shows an exemplary variation of the sheath material for a secondary battery according to an example embodiment of the present disclosure. A sheath material 131 of FIG. 7 has the same characteristics as those of the sheath material 130 for a secondary battery according to an example embodiment as illustrated in FIGS. 1 and 2 except that the functional layer 181 is configured to be united with the protective substrate 180 and thus to form the protective layer 190.

On the other hand, as shown in FIG. 1, the protective layer 90 configured to have the protective substrate 80 adhered with the functional layer 81 including the internal region 83 formed to have a penetrated shape may be manufactured by forming the functional layer 81 on the protective substrate 80 for example, in at least one method of deposition, sputtering, spraying, electric radiation, and printing.

In addition, as shown in FIG. 7, the protective layer 190 configured to have the internal region 183 united with the protective substrate 180 may be manufactured by forming the functional layer 181 on the protective substrate 180 for example, in at least one method of etching, compression molding, masking, a laser, and a plasma.

In the present disclosure, each volume (cm$^3$) of the internal regions 83 and 183 may be 10% to 90%, 20% to 70%, or 30% to 50% based on each unit volume (cm$^3$) of the functional layers 81 and 181. In other words, when each volume of the internal regions 83 and 183 respectively included in the patterns 82 and 182 satisfies the numerical range based on each unit volume of the functional layers 81 and 181, a sheath material for secondary battery having excellent flexibility and strength and appropriately forming an air layer may be realized.

In the internal regions 83 and 183, at least one kind of inert gas selected from the group consisting of nitrogen, argon, and helium may be presented.

Herein, the inert gas may fill 0% to 100% or 5% to 95% of each volume of the internal regions 83 and 183. When the inert gas fills 100% of each volume of the internal regions 83 and 183 to satisfy the numerical range, the flexibility and moisture resistance of the sheath materials 130 and 131 for a secondary battery according to the present disclosure may be desirably improved.

In another embodiment, an extinguishing agent may fill the internal regions 83 and 183. In an embodiment, the extinguishing agent may be one or more selected from an inorganic carbonate, an inorganic phosphate, an inorganic sulfate, an organic phosphate, or a combination thereof. In another embodiment, the extinguishing agent may be at least one selected from sodium bicarbonate, potassium bicarbonate, ammonium phosphate monobasic, or a combination thereof.

On the other hand, the functional layer 81 may include at least one ceramic material selected from $SiO_2$, $Al_2O_2$, CaO, MgO, $K_2O$, or $Na_2O$, at least one polymer material selected from acryl, polypropylene (PP), or polyethylene (PE), or at least one metal material selected from Al, Zn, or Mn.

On the other hand, when the functional layer 181 is configured to be united with the protective substrate 180, the protective substrate 180 and the functional layer 181 may be formed of the same material. That is, the functional layer 181 integrally formed with the protective substrate 180 may be formed of at least one selected from, for example, polyethylene terephthalate, polybutylene terephthalate, polyethylene naphthalate, polybutylene naphthalate, copolymerized polyester, polycarbonate, or a nylon film.

On the other hand, each thickness of the functional layers 81 and 181 may be in a range of 1 μm to 100 μm, 1 μm to 50 μm, or 1 μm to 30 μm. When each thickness of the functional layers 81 and 181 is greater than or equal to 1 μm, the plurality of pattern layers (82, 182) is easily formed, each volume of the internal regions 83 and 183 is increased, and accordingly, the inert gas may be easily injected thereinto. In addition, when the each thickness of the functional layers 81 and 181 is less than or equal to 100 μm, a thin-filmed sheath material for a secondary battery having improved flexibility may be realized.

On the other hand, the resin layer 70 is formed to improve insulating property, electrolyte solution resistance property, and the like of the sheath material 130 for a secondary battery and may be formed of for example, polyolefin or a copolymer of polyolefin, and specifically, the polyolefin may be polyethylene (PE) or polypropylene (PP) but is not limited thereto.

A thickness of the resin layer 70 may be 5 μm to 100 μm, 10 μm to 50 μm, or 15 μm to 30 μm. When the thickness of the resin layer 70 satisfies the numerical range, excellent moldability, adherence, and chemical resistance are obtained.

If needed, a first adhesive layer 51 may be disposed between each functional layer 81 and 181 and the moisture permeation preventing layer 60 to adhere them.

In addition, a second adhesive layer 52 may be disposed between the moisture permeation preventing layer 60 and the resin layer 70 to adhere them.

The first adhesive layer 51 and the second adhesive layer 52 may use any material having adherence well-known in the related art without a particular limit, for example, a poly urethane-based adhesive and the like.

In addition, the first adhesive layer 51 and the second adhesive layer 52 may respectively have a thickness ranging from 1 μm to 10 μm or 1 μm to 5 μm. When the thickness of the adhesive layer satisfies the numerical range, excellent adherence characteristics of each layer consisting of the sheath materials 130 and 131 for a secondary battery may not only be obtained, but also to manufacture the secondary battery into a thin film may be possible.

Next, the configuration of the secondary battery according to an example embodiment of the present disclosure will be described.

Figure 8:
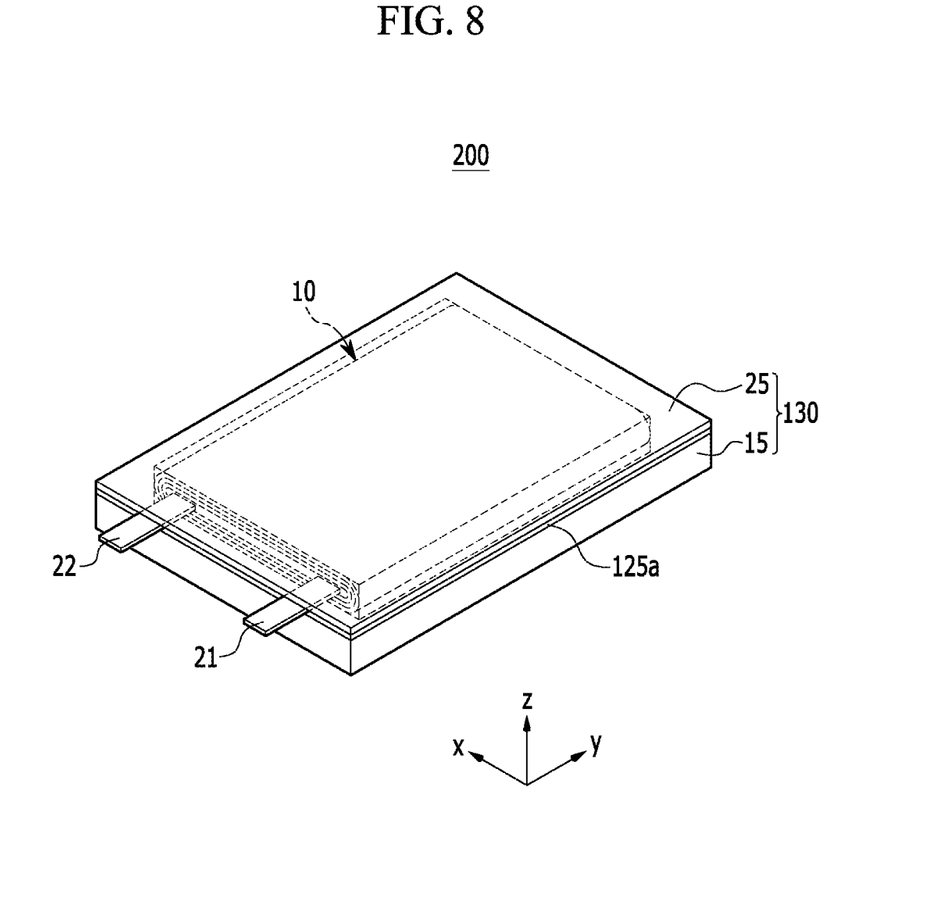
FIG. 8 is a perspective view showing a secondary battery according to an example embodiment of the present disclosure.
Figure 9:
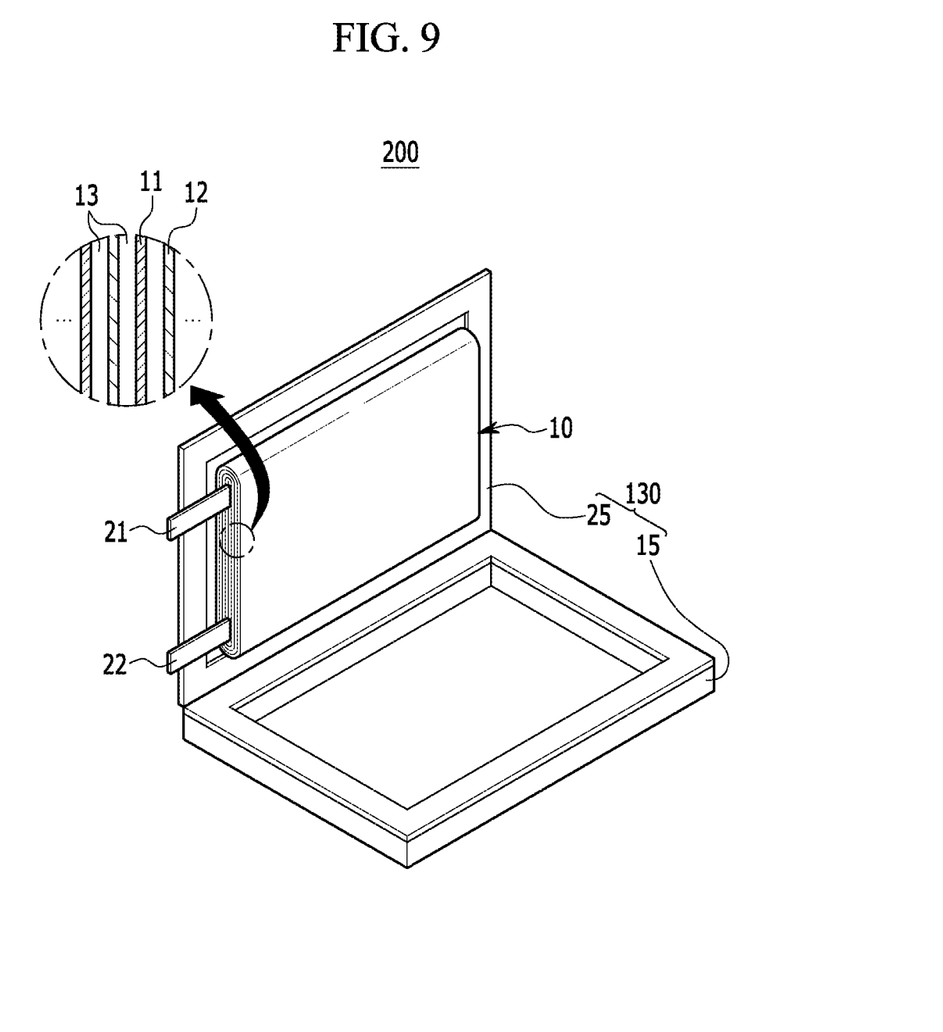
FIG. 9 is an exploded perspective view obtained by disassembling the secondary battery of FIG. 8.

FIG. 8 is a perspective view of a secondary battery according to an example embodiment of the present disclosure, and FIG. 9 is an exploded perspective view obtained by disassembling the secondary battery of FIG. 8.

Referring to FIGS. 8 and 9, a secondary battery 200 of an example embodiment of the present disclosure includes an electrode assembly 10 and the sheath material 130 housing the electrode assembly 10, and the sheath material 130 may be one of the above sheath materials 130 and 131.

First, the electrode assembly 10 performs a charge and discharge function and is manufactured to include a positive electrode 11 as a first electrode and a negative electrode 12 as second electrode and a separator 13 disposed therebetween. Herein, polarity of the first and second electrodes is not particularly limited thereto. In other words, the first electrode may be the negative electrode 12, while the second electrode may be the positive electrode 11.

On the other hand, the positive electrode 11 includes a positive current collector formed of a metal thin plate such as aluminum and the like and a positive active material layer formed on the positive current collector, and the negative electrode 12 includes a negative current collector formed of a metal thin plate such as copper and the like and a negative active material layer formed on the negative current collector.

In addition, the electrode assembly 10 may be formed to have a flat structure obtained by disposing the separator 13 between the band-shaped positive and negative electrodes 11 and 12 and then, spirally winding and compressing them.

However, the present invention is not limited thereto, but the electrode assembly 10 may have a structure of alternatively stacking a plurality of rectangular sheet-shaped positive and negative electrodes 11 and 12 with the separator 13 therebetween. Herein, the separator 13 is disposed between the positive and negative electrodes 11 and 12 and thus insulates the positive and negative electrodes 11 and 12 and provides a passage for moving ions.

Subsequently, a positive uncoated region and a negative uncoated region are located at one end of the electrode assembly 10, and in the positive uncoated region, a positive terminal end is adhered thereto through welding, while in the negative uncoated region, a negative terminal is adhered thereto through welding.

In a secondary battery according to an example embodiment of the present invention, the electrode assembly 10 is housed in the sheath material 130, and a receiving portion 15 having an opening at one side and a covering portion 25 sealing the opening may be included therein.

Herein, the receiving portion 15 may be formed to have the opening at one wide side of a hexahedron for example, in a method of injection, forming, and the like.

The above electrode assembly 10 is inserted into this opening, and the opening is sealed with the covering portion 25.

Herein, the covering portion 25 may be closed and sealed along one line of the receiving portion 15 where the opening is present by using an adhesive.

Otherwise, in the present invention, the covering portion 25 may be closed and sealed in a method of thermal welding and the like after directly adhering the resin layers 70 of the sheath materials forming the receiving portion 15 and the covering portion 25 without a separate adhesive.

The secondary battery 200 according to the present disclosure may realize a secondary battery having very excellent durability despite application of a thin film sheath material and also, excellent performance by applying the much thinner sheath material for a secondary battery than a conventional one to improve energy density of electrons.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

80: protective substrate
90, 190: protective layer
81, 181: functional layer
82, 182: pattern
83, 183: internal region
60: moisture permeation preventing layer
70: resin layer
130, 131: sheath material for secondary battery
200: secondary battery
10: electrode assembly
21: positive terminal
22: negative terminal
15: receiving portion
25: covering portion
11: positive electrode
12: negative electrode
13: separator

What is claimed is:

1. A sheath material for a secondary battery, comprising:
a moisture permeation preventing layer;
a protective layer disposed on a first surface of the moisture permeation preventing layer wherein the protective layer includes a functional layer having a plurality of patterns and further includes a protective substrate extending in parallel with the moisture permeation preventing layer and covering internal regions of the plurality of patterns, a pattern of the plurality of patterns comprising an internal region of the internal regions in which an extinguishing agent is disposed; and
a resin layer disposed on a second surface of the moisture permeation preventing layer.

2. The sheath material for the secondary battery of claim 1, wherein the plurality of patterns comprises at least one of circular, oval, triangle, quadrangle, polygonal, and irregularly shaped closed curves.

3. The sheath material for the secondary battery of claim 1, wherein a sum of areas of horizontal cross-sections of the plurality of patterns is 10% to 90% of an areas of a horizontal cross-section of the functional layer.

4. The sheath material for the secondary battery of claim 2, wherein an other pattern of the plurality of patterns comprises an other internal region of the internal regions in which at least one inert gas selected from nitrogen, argon, or helium is present.

5. A sheath material for a secondary battery, comprising:
a moisture permeation preventing layer;
a protective layer disposed on a first surface of the moisture permeation preventing layer wherein the protective layer includes a functional layer having a plurality of patterns and further includes a protective substrate extending in parallel with the moisture permeation preventing layer and covering internal regions of the plurality of patterns; and
a resin layer disposed on a second surface of the moisture permeation preventing layer,
wherein each of the plurality of patterns comprises an internal region of the internal regions in which at least one inert gas selected from nitrogen, argon, or helium is present, and
wherein a volume ($cm^3$) of the internal region is 10% to 90% of a unit volume ($cm^3$) of the functional layer.

6. The sheath material for the secondary battery of claim 4, wherein the inert gas fills 0% to 100% of a volume of the other internal region.

7. The sheath material for the secondary battery of claim 1, wherein the extinguishing agent comprises an inorganic carbonate, an inorganic phosphate, an inorganic sulfate, an organic phosphate, or a combination thereof.

8. The sheath material for the secondary battery of claim 1, wherein the extinguishing agent comprises sodium bicarbonate, potassium bicarbonate, ammonium phosphate monobasic, or a combination thereof.

9. The sheath material for the secondary battery of claim 1, wherein the functional layer includes:
at least one ceramic material selected from $SiO_2$, $Al_2O_2$, CaO, MgO, $K_2O$, or $Na_2O$;
at least one polymer material selected from acryl, polypropylene (PP), or polyethylene (PE); or
at least one metal material selected from Al, Zn, or Mn.

10. The sheath material for the secondary battery of claim 1, wherein a thickness of the functional layer is in a range of 1 μm to 100 μm.

11. A secondary battery, comprising:
an electrode assembly, and
the sheath material of claim 1 containing the electrode assembly.

* * * * *